United States Patent
Shimura et al.

(10) Patent No.: US 10,165,148 B2
(45) Date of Patent: Dec. 25, 2018

(54) INFORMATION RECORDING DEVICE, INFORMATION RECORDING METHOD, AND NON-TRANSITORY STORAGE MEDIUM STORING INFORMATION RECORDING PROGRAM

(71) Applicant: OLYMPUS CORPORATION, Hachioji-shi, Tokyo (JP)

(72) Inventors: Kazuhiko Shimura, Hachioji (JP); Yoshiyuki Fukuya, Sagamihara (JP); Kazuo Kanda, Higashiyamato (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/262,739

(22) Filed: Sep. 12, 2016

(65) Prior Publication Data

US 2017/0078515 A1  Mar. 16, 2017

(30) Foreign Application Priority Data

Sep. 14, 2015  (JP) ................. 2015-180939

(51) Int. Cl.
  *H04N 1/21*  (2006.01)
  *H04N 1/00*  (2006.01)

(52) U.S. Cl.
  CPC ......... *H04N 1/212* (2013.01); *H04N 1/00095* (2013.01); *H04N 1/00413* (2013.01); *H04N 2201/0084* (2013.01); *H04N 2201/3252* (2013.01)

(58) Field of Classification Search
  CPC ............. H04N 1/212; H04N 1/00095; H04N 1/00413; H04N 2201/3252; H04N 2201/0084
  See application file for complete search history.

(56) References Cited

U.S. PATENT DOCUMENTS

| | | | | |
|---|---|---|---|---|
| 2002/0198936 | A1* | 12/2002 | McIntyre | G11B 27/105 709/203 |
| 2003/0007078 | A1* | 1/2003 | Feldis, III | G11B 27/105 348/231.6 |
| 2003/0161003 | A1* | 8/2003 | Herbert | H04N 1/00132 358/1.18 |
| 2004/0046868 | A1* | 3/2004 | Anderson | H04N 1/00151 348/207.11 |
| 2004/0172419 | A1* | 9/2004 | Morris | G06F 17/30265 |
| 2005/0134939 | A1* | 6/2005 | Ikeda | H04N 1/00448 358/471 |
| 2005/0254089 | A1* | 11/2005 | Oliver | H04N 1/00127 358/1.16 |
| 2006/0234765 | A1* | 10/2006 | Herberger | G11B 27/034 455/552.1 |

(Continued)

FOREIGN PATENT DOCUMENTS

JP  3478759 B2  12/2003

*Primary Examiner* — Timothy J Henn (74) *Attorney, Agent, or Firm* — Volpe and Koenig, P.C.

(57) ABSTRACT

An information recording device includes a data acquisition unit and a service information recording unit. The data acquisition unit acquires data. The service information recording unit records in a recording unit service information including information regarding each of a plurality of services which may be performed utilizing the data acquired by the data acquisition unit in association with the data acquired by the data acquisition unit.

11 Claims, 9 Drawing Sheets

(56) References Cited

U.S. PATENT DOCUMENTS

| | | | | |
|---|---|---|---|---|
| 2007/0297767 | A1* | 12/2007 | Takei | G11B 27/034 386/230 |
| 2009/0002522 | A1* | 1/2009 | Murai | G06F 17/3028 348/231.2 |
| 2009/0316021 | A1* | 12/2009 | Nozaki | H04N 5/232 348/231.2 |
| 2012/0200738 | A1* | 8/2012 | Iwasaki | H04N 5/23293 348/231.2 |
| 2014/0204244 | A1* | 7/2014 | Choi | H04N 5/23222 348/231.99 |
| 2014/0267867 | A1* | 9/2014 | Lee | H04N 5/23293 348/333.01 |

\* cited by examiner

INFORMATION RECORDING DEVICE, INFORMATION RECORDING METHOD, AND NON-TRANSITORY STORAGE MEDIUM STORING INFORMATION RECORDING PROGRAM

CROSS-REFERENCE TO RELATED APPLICATIONS

This application is based upon and claims the benefit of priority from prior Japanese Patent Application No. 2015-180939, filed Sep. 14, 2015, the entire contents of which are incorporated herein by reference.

BACKGROUND OF THE INVENTION

1. Field of the Invention

The present invention relates to an information recording device recording information related to various data, an information recording method, and a non-transitory storage medium storing an information recording program.

2. Description of the Related Art

Recently, various services utilizing networks have been developed. As this type of service, for example, regarding the field of digital cameras, image storage services or album creation services, etc., are known. As a suggestion for services utilizing such networks, an image communication device suggested in, for example, Japanese Patent No. 3478759 is such that, when transmitting an image file to a facsimile device utilizing a facsimile communication network, the file format of the image file to be transmitted is converted into a printer driver format restorable by a facsimile communication network service. This allows the transmitted image file to be restored faithfully at the facsimile device.

BRIEF SUMMARY OF THE INVENTION

According to a first aspect of the invention, an information recording device comprises: a data acquisition unit configured to acquire data; and a service information recording unit configured to record in a recording unit service information including information regarding each of a plurality of services which may be performed utilizing the data acquired by the data acquisition unit in association with the data acquired by the data acquisition unit.

According to a second aspect of the invention, an information recording method comprises: acquiring data; and recording in a recording unit service information including information regarding each of a plurality of services which may be performed utilizing the acquired data, in association with the acquired data.

According to a third aspect of the invention, a computer-readable non-transitory storage medium stores an information recording program which causes a computer to: acquire data; and record in a recording unit service information including information regarding each of a plurality of services which may be performed utilizing the acquired data, in association with the acquired data.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
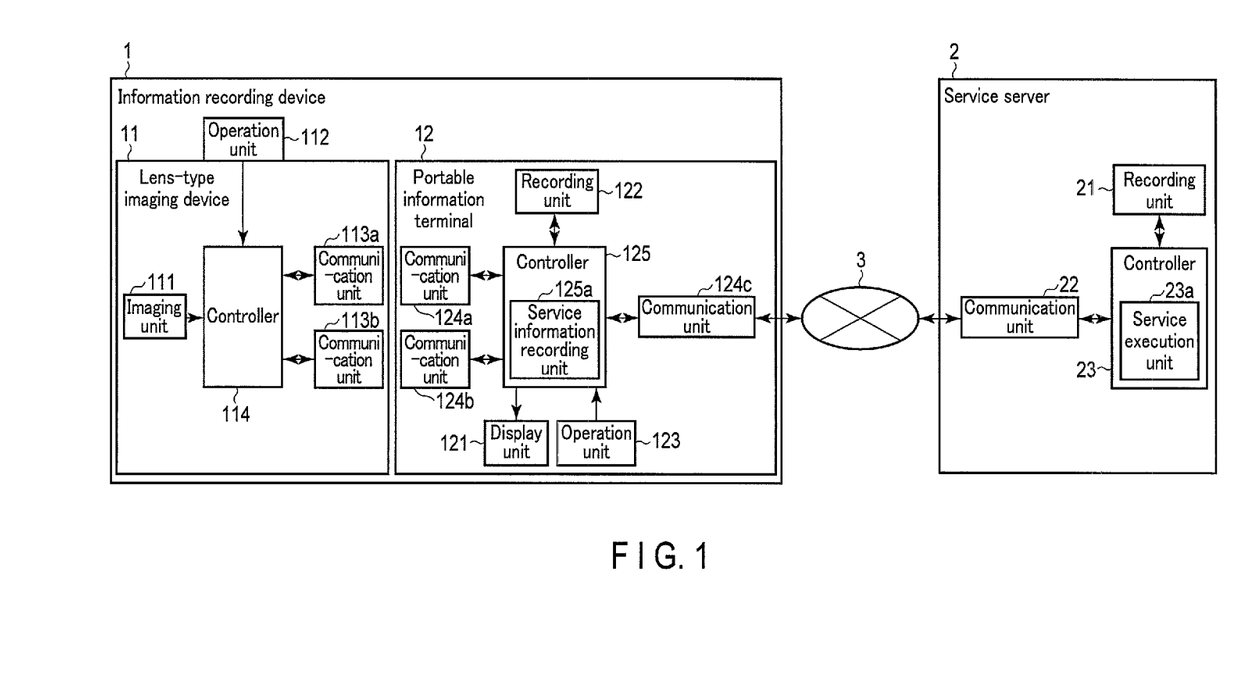
FIG. 1 shows a configuration of a communication system including an information recording device according to an embodiment of the present invention.

Hereinafter, an embodiment of the present invention will be explained with reference to the drawings. FIG. 1 shows a configuration of a communication system including an information recording device according to the embodiment of the present invention. As shown in FIG. 1, the communication system comprises an information recording device 1 and a service server 2. The information recording device 1 and the service server 2 are connected communicatively through, for example, a network 3. The information recording device 1 and the service server 2 may also be connected communicatively by direct communication, which is not through the network 3.

The information recording device 1 comprises a lens-type imaging device 11 and a portable information terminal 12. The lens-type imaging device 11 independently has a photographing function; however, does not have a display function. When the lens-type imaging device 11 is mounted on the portable information terminal 12, an image obtained by the lens-type imaging device 11 may be displayed on a display unit of the portable information terminal 12.

The lens-type imaging device 11 has an interchangeable lens-type chassis. The chassis comprises an imaging unit 111, an operation unit 112, communication units 113a and 113b, and a controller 114.

The imaging unit 111 is an example of a data acquisition unit, comprises a photographing lens, a diaphragm, and an imaging element, etc., and images an object to generate image data as an example of data according to the object. The photographing lens may include a focusing lens or a zoom lens, etc. The imaging element may be a CCD sensor or a CMOS sensor, etc.

The operation unit 112 is an operation unit for a user to perform various types of operation of the lens-type imaging device 11, and, for example, includes a release button. The release button is a button for the user to instruct the photographing to be started. The operation unit 112 may include a touch panel, or may include an operation unit such as a focus ring or a zoom ring.

The communication units 113a and 113b include an interface for communication with the portable information terminal 12. The communication unit 113a is a communication unit used for high-speed and high-capacity communication compared to the communication unit 113b. The communication unit 113a is, for example, a communication unit for a WiFi communication. The communication unit 113b is a communication unit used for low-capacity and low power consumption communication in comparison to the communication unit 113a. The communication unit 113a is, for example, a communication unit for Bluetooth communication.

The controller 114 includes a CPU and a memory, and controls the operation of the lens-type imaging device 11. The controller 114 may be configured by ASIC and FPGA, etc. The controller 114 controls, for example, an imaging operation performed by the imaging unit 111. The controller 114 controls communication operations performed by the communication unit 113a or 113b.

The portable information terminal 12 comprises a display unit 121, a recording unit 122, an operation unit 123, communication units 124a, 124b, and 124c, and a controller 125.

The display unit 121 is, for example, a liquid crystal display or an organic EL display, and displays various types of images.

The recording unit 122 is, for example, a flash memory. The recording unit 122 records various types of data of image files, etc. generated based on image data sent from the lens-type imaging device 11. The recording unit 122 records various types of programs executed by the controller 125. The program includes a camera application which has the portable information terminal 12 function as a camera by cooperative operation with the lens-type imaging device 11.

The operation unit 123 is an operation unit for the user to perform various types of operation of the portable information terminal 12, and includes, for example, a touch panel provided integrally with the display unit 121. The operation unit 123 may include, for example, an operation unit other than the touch panel, such as a power button.

The communication units 124a and 124b include an interface for communicating with the lens-type imaging device 11. The communication unit 124a is a communication unit for performing communication corresponding to the communication unit 113a. The communication unit 124b is a communication unit for performing communication corresponding to the communication unit 113b. The communication unit 124c includes an interface for communicating with the service server 2. The communication unit 124c is a communication unit for performing communication using, for example, a WiFi communication or a portable phone line.

The controller 125 includes a CPU or a memory and controls the operation of the portable information terminal 12. The controller 125 may be configured by ASIC, etc. The controller 125, for example, functions as a display controller and controls the display operation performed by the display unit 121. The controller 125 controls the communication operation performed by the communication unit 124a, 124b, or 124c.

The controller 125 of the present embodiment functions as a service information recording unit 125a. The service information recording unit 125a functions to record, in association with image data, service information including information regarding each of a plurality of services which may be performed at the service server 2 by utilizing image data sent from the lens-type imaging device 11. The service information is recorded, for example, as meta information associated with the image data. Alternatively, the service information is recorded as meta information in a file separate from an image file where the image data is recorded. The function of this service information recording may have information regarding the following services selected by the user's preference provided inside a service recording unit 122a.

Here, the service in the present embodiment includes, for example, an album creation service, a slide show creation service, a moving image creation service, or an image storage service. The album creation service is a service for creating an electronic album or a paper album based on the image data. The slide show creation service is a service for creating a slide show based on the image data. The moving image creation service is a service for creating a moving image based on the image data. The image storage service is a service for recording an image file in a recording unit 21 of the service server 2. In addition, various handling performed by utilizing the image data, such as the image processing mentioned above, processing, and content creation for viewing are included in the "service" of the present embodiment.

The service information further includes, for example, information indicating demands for each service. For example, in the case of the album creation service, information on an image range to be used for the album (aspect ratio, etc.), information indicating how to arrange a photograph, and information on the shape of a frame to arrange the photograph are included. In the case of the slide show creation service, information indicating which frame (nth frame) to display an image based on corresponding image data, and information indicating which position in an image an image effect should be applied as information, on the assumption that a slide show accompanying a specific image effect (for example, scaling processing) is to be created, are included. In the case of a moving image creation service, information indicating an image range of image data used for a moving image (aspect ratio, etc.), and information indicating which position in an image an image effect should be applied as information, on the assumption that a moving image accompanying a specific image effect (for example, scaling processing) is created, are included. As other information, information indicating an important position (or unimportant position) inside an image as information common to the album creation service, the slide show creation service, and the image moving creation service is included.

The service server 2 is, for example, a personal computer, and comprises a recording unit 21, a communication unit 22, and a controller 23.

The recording unit 21 is, for example, a hard disk. In the recording unit 21, an image file sent from the portable information terminal 12 is recorded. The recording unit 21 records various types of programs executed by the controller 23.

The communication unit 22 is a communication unit for performing communication corresponding to the communication unit 124c. The communication unit 22 and the communication unit 124c in FIG. 1 perform communication through the network 3; however, the communication unit 22 and the communication unit 124c may also perform communication without communicating through the network 3. The communication unit 22 may also perform communication with the lens-type imaging device 11.

The controller 23 includes a CPU and a memory and controls the operation of the service server 2. The controller 23 may be configured by ASIC, etc. The controller 23 performs a variety of processing in accordance with, for example, a request from the portable information terminal 12. The controller 23 further controls the communication operation of the communication unit 22. Furthermore, the controller 23 in the present embodiment functions as a service execution unit 23a. The service execution unit 23a functions to execute various types of services utilizing an image file in accordance with a request from the portable information terminal 12. This service includes, for example, the album creation service, the slide show creation service, the moving image creation service, and the image storage service.

The services in the present embodiment are not necessarily limited to being executed only by the service server 2. In other words, for example, the album creation service, the slide show creation service, and the moving image creation service may be performed by separate service servers. One service may be executed by a plurality of service servers. Furthermore, the services in the present embodiment may also include services with the help of manpower.

Figure 2:
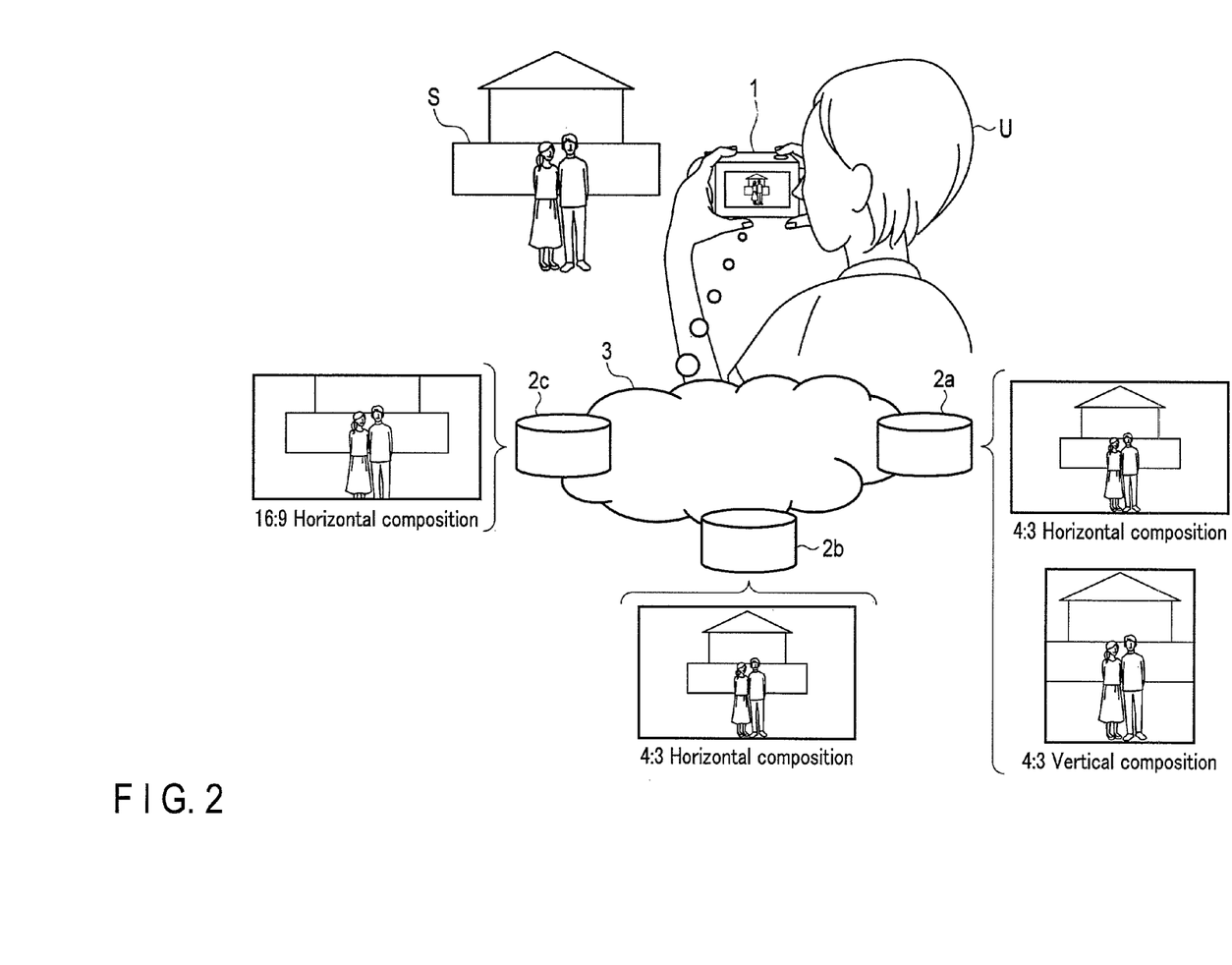
FIG. 2 explains an operation of the communication system according to the embodiment of the present invention.

Hereinafter, the operation of the communication system of the present embodiment will be explained. FIG. 2 explains the operation of the communication system of the present embodiment. In the example of FIG. 2, a user U photographs a photographing subject S using the information recording device 1 (in the example of FIG. 1, the lens-type imaging device 11 and the portable information terminal 12). The information recording device 1 records image data in the recording unit 21. The information recording device 1 also records service information generated in accordance with a request from the user U in the recording unit 21. The image data and the service information are sent to the service servers 2a, 2b, and 2c through the network 3 at a predetermined timing.

The service servers 2a, 2b, and 2c perform different services using the sent image data and service information. Here, say the service server 2a is a server for the album creation service, the service server 2b is a server for the slide show creation service, and the service server 2c is a server for the moving image creation service. As mentioned above, each of the service servers 2a, 2b, and 2c may be configured by a plurality of servers. The service servers 2a, 2b, and 2c may also be configured altogether in one server.

For example, the service server 2a creates an album by trimming the image data recorded in the image file by one of a horizontal composition with an aspect ratio of 4:3 and a vertical composition with an aspect ratio of 4:3, and by arranging the trimmed image data appropriately. At this time, the service server 2a recognizes a trimming range based on the service information associated with the image data. In the case where the service information is not associated with the image data, the service server 2a creates the album by, for example, trimming in a horizontal composition with an aspect ratio of 4:3 or a vertical composition with an aspect ratio of 4:3 so as to include the center of the image, and by arranging the trimmed image data appropriately.

The service server 2b creates a slide show by trimming the image data recorded in the image file in a horizontal composition with an aspect ratio of 4:3, and by adding an image effect in the scale of the trimmed image data. At this time, the service server 2b recognizes in which area in the image data the scaled image effect should be added from the service information associated with the image data. In the case where the service information is not associated with the image data, the service server 2b adds the scaled image effect to, for example, a predetermined area including the center of the image in accordance with a predetermined rule.

The service server 2c creates a moving image file by trimming the image data recorded in the image file in a horizontal composition of 16:9. At this time the service server 2c recognizes the trimming range based on the service information associated with the image data. In the case where the image data is not associated with the service information, in accordance with a predetermined rule, the service server 2a trims the image data, for example, in the horizontal composition with the aspect ratio of 16:9 so as to include the image center.

In this manner, the present embodiment is capable of handling various types of services which may be performed in the future by associating the image data with the service information.

Figure 3A:
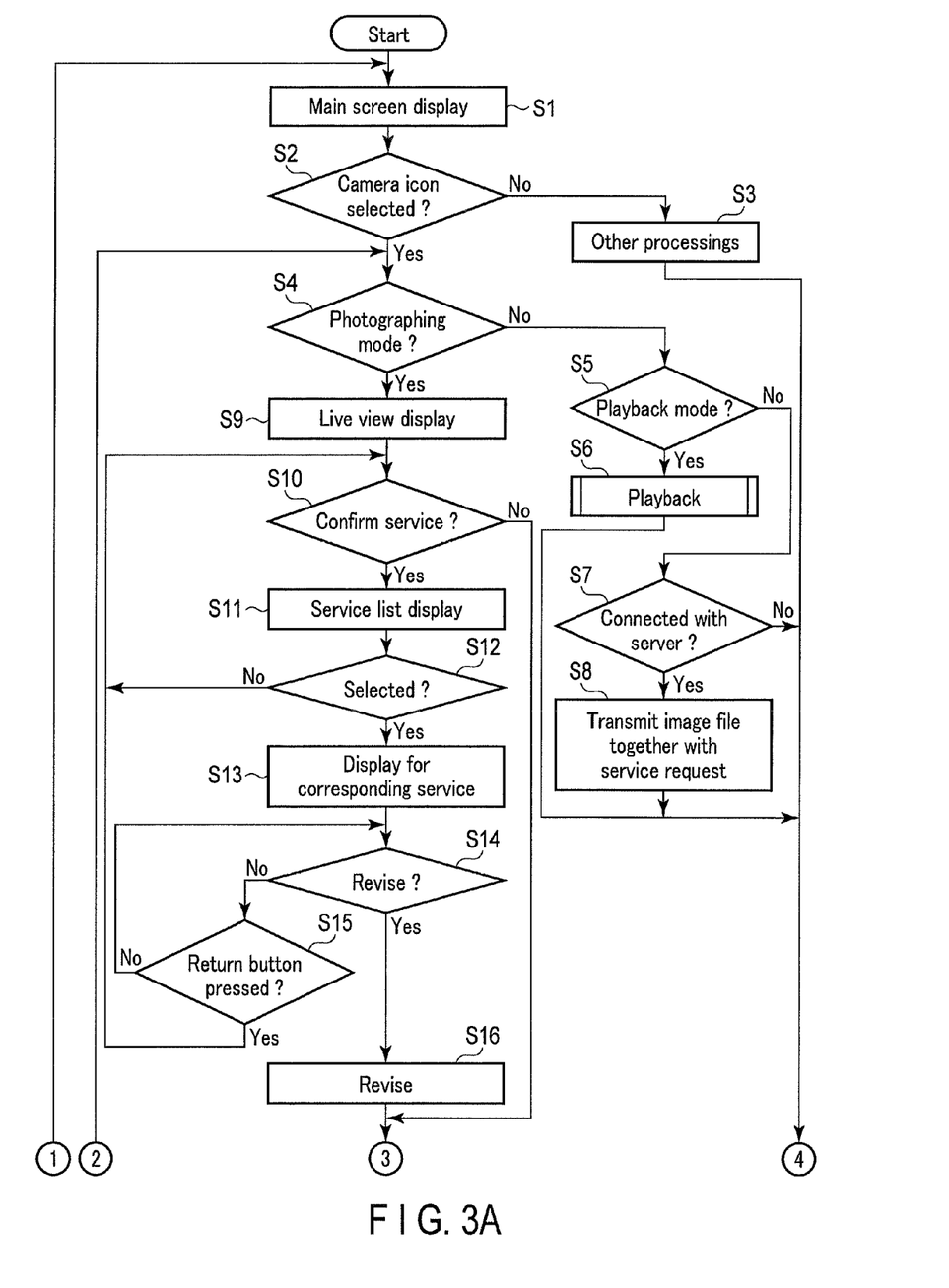
FIG. 3A is a first view of a flowchart showing an operation of the information recording device according to the embodiment of the present invention.
Figure 3B:
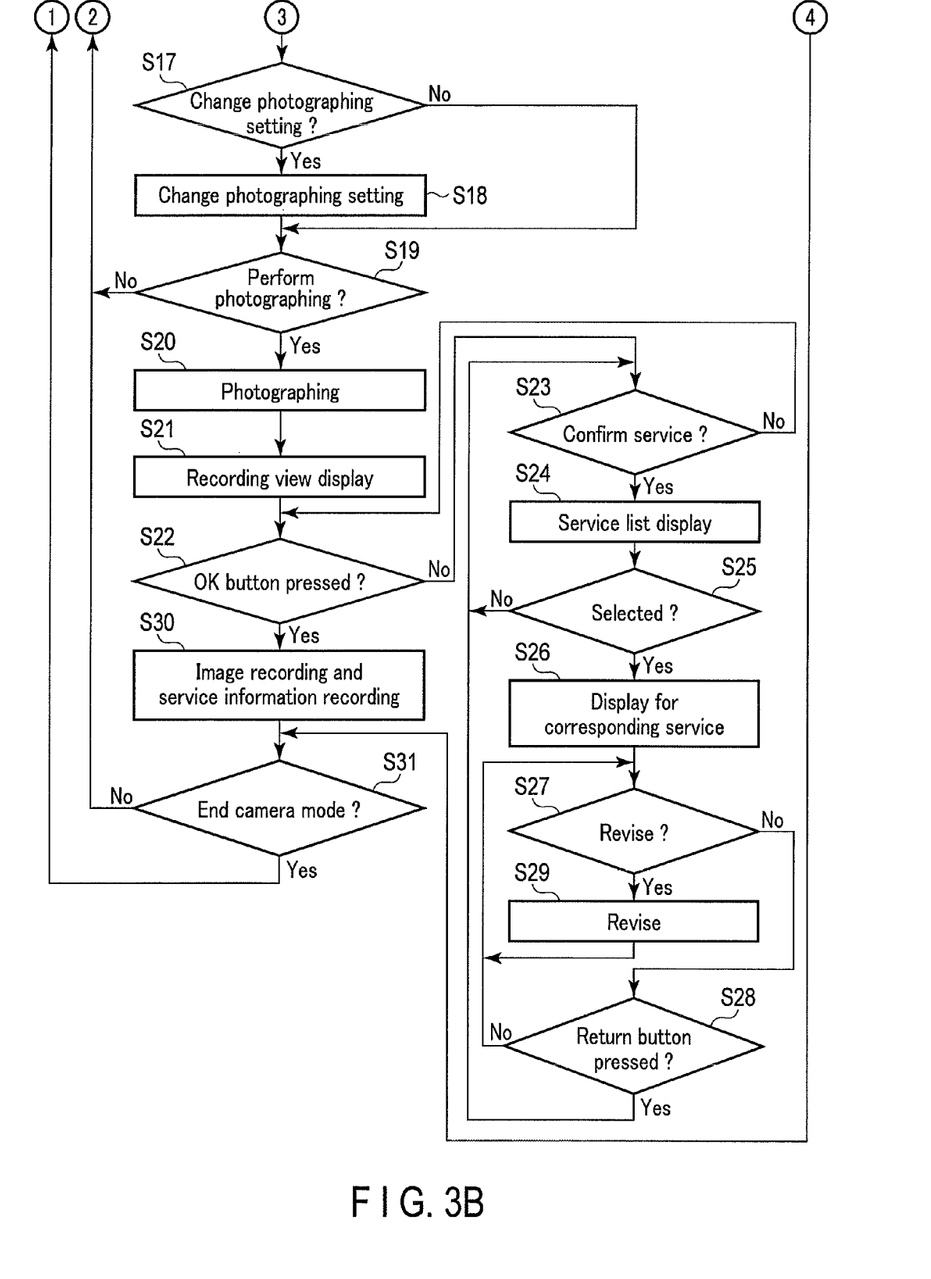
FIG. 3B is a second view of the flowchart showing the operation of the information recording device according to the embodiment of the present invention.

The operation of the information recording device 1 will be explained in further detail hereinafter. FIG. 3A and FIG. 3B are flowcharts indicating the operation of the information recording device 1 in the present embodiment. Here, as an example, as shown in FIG. 1, the information recording device 1 is considered as being divided into the lens-type imaging device 11 and the portable information terminal 12. However, the information recording device 1 does not necessarily have to be divided into the lens-type imaging device 11 and the portable information terminal 12. For example, the information recording device 1 may have both functions of the lens-type imaging device 11 and the portable information terminal 12.

Figure 4A:
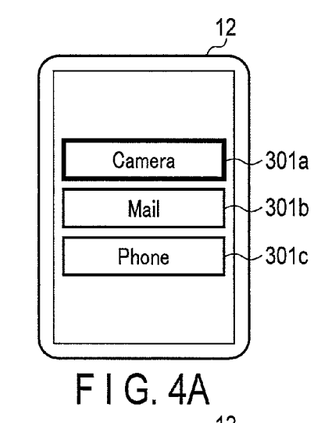
FIGS. 4A, 4B, 4C, 4D, 4E, and 4F show display examples on a display unit of a portable information terminal.

In step S1, the controller 125 of the portable information terminal 12 has a main screen displayed on the display unit 121. FIG. 4A shows a display example of the main screen. As shown in FIG. 4A, on the main screen, a list of applications that may be executed at the portable information terminal 12 is displayed by icons. For example, a camera icon 301a is an icon indicating a camera application for having the portable information terminal 12 function as a camera by cooperative operation with the lens-type imaging device 11. A mail icon 301b is an icon indicating a mail application for transmitting/receiving email using the portable information terminal 12. A telephone icon 301c is an icon indicating a telephone application for communication using the portable information terminal 12. These icons may be selected by a touch panel of the operation unit 123. Here, the icons shown in FIG. 4A are an example. The portable information terminal 12 may have various types of applications other than the camera application, the mail application, and the telephone application.

In step S2, the controller 125 determines whether or not the camera icon 301a has been selected. In step S2, in the case where the camera icon 301a is determined as not being selected, the processing moves onto step S3. Instep S2, in the case where the camera icon 301a is determined as being selected, the processing moves on to step S4.

In step S3, the controller 125 performs processing other than in the case where the camera icon 301a is selected. Subsequently, the processing moves on to step S31. The other processings are transmission/reception processing of emails in the case where the email icon 301b is selected, and communication processing in the case where the telephone icon 301c is selected, etc. The explanation on the details of these processings will be omitted.

In step S4, the controller 125 activates the camera application and shifts to a camera mode. Subsequently, the controller 125 determines whether or not the current operation mode is a photographing mode. The operation mode of the camera application in the present embodiment includes a photographing mode, a playback mode, and a communication mode. The photographing mode is a mode for photographing an image. The playback mode is a mode for playing back an image. The communication mode is a mode for transmitting an image file to the service server 2. The operation mode is set, for example, by an operation of the operation unit 123 by a user U. In step S4, in the case where the present mode is determined as not being the photographing mode, the processing moves on to step S5. In step S4, in the case where the present mode is determined as being the photographing mode, the processing moves on to step S9.

In step S5, the controller 125 determines whether or not the present mode is a playback mode. In step S5, in the case where the present mode is determined as being the playback mode, the processing moves on to step S6. In step S5, in the case where the present mode is determined as not being the playback mode, that is, the present mode is determined as the communication mode, the processing moves on to step S7.

In step S6, the controller 125 performs playback processing to play back an image file recorded in the recording unit 122. In this playback processing, the controller 125 has the display unit 121 display a list of image files recorded in the recording unit 122. In the case where the image file is selected by the user U, the controller 125 plays back the corresponding image file on the display unit 121. Subsequently, in the case where the user U performs a stop operation of the image file playback, the controller 125 ends the playback processing. Subsequently, the processing moves on to step S31. In step S7, the controller 125 attempts to establish a communication connection with the service server 2 (one of or all of the service servers 2a, 2b, and 2c) using the communication unit 124c. The controller 125 determines whether or not the communication connection between the portable information terminal 12 and the service server 2 has been established. Here, the information (for example, a URL) of the service server 2 used to attempt to establish the communication connection with in step S7 is set in advance in the portable information terminal 12. The information (for example, URL) of the service server 2 is, for example, notified to the portable information terminal 12 from the service server every time a new service server 2 is set. In the case of attempting to establish the communication connection with all of the service servers 2a, 2b, and 2c, the communication connection may be determined as being established in the case where the communication connection has been established with one of the service servers, or only in the case where the communication connection has been established with all of the servers. Instep S7, in the case where the communication connection is determined as being established with the service server 2, the processing moves on to step S8. In step S7, in the case where the communication connection with the service server 2 is determined as not being established, the processing moves on to step S31.

In step S8, the controller 125 requests the service to be executed and has the image file transmitted to the service server 2 with which the communication connection has been established. Subsequently, the processing moves on to step S31. Having received the request for executing the service, the service server 2 performs the service utilizing the image data by referring to the service information as needed. Here, the service server 2 performs the service in accordance with the request from the portable information terminal 12. In contrast, the service by the service server 2 may also be performed in accordance with a request from other service servers. For example, in step S8, the communication system may be configured in a manner that only by transmitting the image file to a portal server with an image storage service, a request for a service is made from this portal server to a service server executing other services.

Figure 4B:
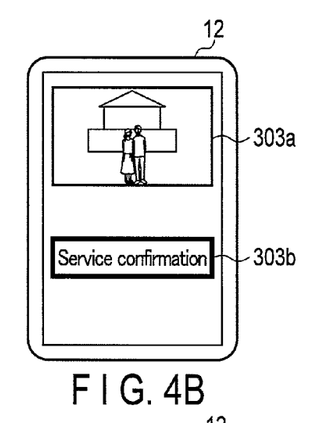

In step S9, the controller 125 performs a live view display. Therefore, the controller 125 instructs the controller 114 of the lens-type imaging device 11 to transmit a live view image. Having received this instruction, the controller 114 performs imaging by the imaging unit 111. The controller 114 transmits the image data obtained by the imaging performed by the imaging unit 111 to the portable information terminal 12 using the communication unit 113a or the communication unit 113b. The communication of this image data is performed basically by using the communication unit 113a. In the case where it is difficult to perform communication by the communication unit 113a, the communication unit 113b is used. When the image data is received, the controller 125 displays on the display unit 121 an image based on the received image data. By such live view display, the user U is capable of confirming the composition, etc. by using the display unit 121. FIG. 4B shows a display example of when the live view is displayed. In the present embodiment, a service confirmation button 303b is displayed upon the live view display along with a live view image 303a.

In step S10, the controller 125 determines whether or not to perform service confirmation. Here, for example, in the case where the service confirmation button 303b is selected by the operation of the operation unit 123 by the user U, the service confirmation is determined as being performed. In step S10, in the case where the service confirmation is determined as being performed, the processing moves on to step S11. In step S10, in the case where the service confirmation is determined as not being performed, the processing moves on to step S17.

Figure 4C:
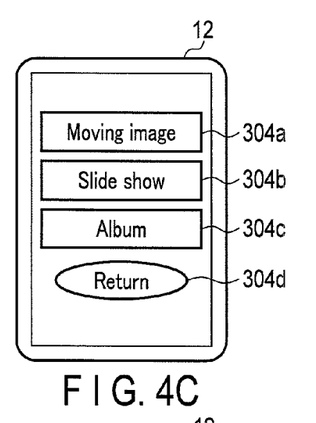

In step S11, the controller 125 has the display unit 121 display a list of the names of services that may be performed utilizing the image data. FIG. 4C shows an example of a list display. As the names of services, in FIG. 4C, a moving image creation service 304a, a slide show creation service 304b, and an album creation service 304c are list displayed. The information of the above services may be acquired from the service server 2 when in the communication mode, or may be determined by the portable information terminal 12 from the user's usage history. The information of a service may also be acquired collectively from the portal server. In the case where there are so many names of services that they cannot be displayed On the screen of the display unit 121, it may be configured to display the other names of services by a scroll display. Since various services exist on the Internet, there are many services other than those for images. In such case, the complication on the screen may be reduced by narrowing down the services to be displayed to services regarding images, without displaying unnecessary service names, when photographing. Furthermore, as in the case of email services, there are services that are not directly related to images. However, since this is relevant in cases of photographing images for attachment, etc., such services should also be displayed.

In step S12, the controller 125 determines whether or not the user U has selected a name of one service from the names of services list that is displayed by operating the operation unit 123. In step S12, in the case where the name of a service is determined as being selected, the processing moves onto step S13. In step S12, in the case where the name of a service is determined as not being selected (in the case where a return button 304 has been selected, or in the case where a predetermined time has lapsed without the selection being made), the processing returns to step S10.

Figure 4D:
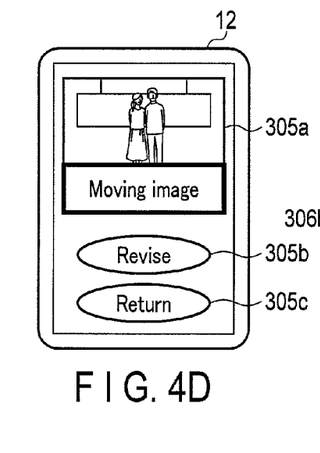

In step S13, the controller 125 executes a display that corresponds to the selected service. This display is a processing that displays a live view image indicating the state of the image data when a corresponding service is assumed to have been performed. For example, FIG. 4D is a display in the case where the moving image creation service 304a has been selected. In this display, in the same manner as for the moving image created at the service server 2b, a live view image 305a is displayed based on image data obtained by trimming the image data for live view display in a horizontal composition with the aspect ratio of 16:9. Such display will allow the user U to ascertain in advance the content of the service to be performed at the service server 2b. A display based on such assumption may be acquired from a server, or may be set by a user as a memorandum record. For example, regarding the aspect ratio, etc., in a moving image site which handles a moving image of 16:9, an image of 4:3 or 3:2 is reduced or supplemented and displayed. However, since this may bother some users, the setting may be decided based on the user's particular preference. Therefore, this should be configured in a manner that a service to be a utilization candidate may be recognized from the character of the image, and notice information classified for each of the services is issued.

In step S14, the controller 125 determines whether or not to revise the service. Here, for example, in the case where the user U selects a revise button 305b by the operation of the operation unit 123, the service is determined as being revised. In step S14, in the case where the service is determined as not being revised, the processing moves onto step S15. In step S14, in the case where the service is determined as being revised, the processing moves on to step S16.

In step S15, the controller 125 determines whether or not the user U has selected the return button 305c by the operation of the operation unit 123. In step S15, in the case where the return button 305c is determined as not being selected, the processing returns to step S14. In step S15, in the case where the return button 305c is determined as being selected, the processing returns to step S10.

Figure 4E:
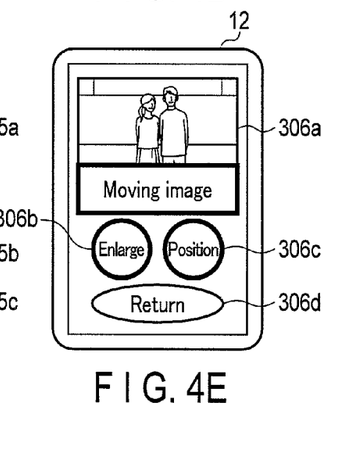

In step S16, the controller 125 receives the revise operation from the user U. For example, FIG. 4E is an example of a display for revision with respect to the moving image creation service 304a. In the case where an enlarge button 306b is selected in this display, while the aspect ratio of 16:9 is maintained, an enlarging processing of the image data for live view display is performed, and a live view image 306a obtained after the enlarging processing is displayed. The magnification is set by, for example, the user U operating the operation unit 123. In the case where a position button 306c is selected, a change is made in the trimming position of the image data for live view display, and the live view image 306a obtained after the change in the trimming position is displayed. The trimming position is set by, for example, the user U operating the operation unit 123. In the case where these revisions are made, the details of these revisions are stored in a memory of the controller 125 as service information. In the case where the return button 306d is selected, the revision is ended. In this case, the processing moves on to step S17.

In step S17, the controller 125 determines whether or not a photographing setting has been changed by the user U operating the operation unit 123. The photographing setting includes, for example, an exposure parameter setting, an image processing parameter setting, and a photographing parameter setting such as a file format of image files. In step S17, in the case where the photographing setting is determined as being changed, the processing moves on to step S18. In step S17, in the case where the photographing setting is determined as being unchanged, the processing moves on to step S19.

In step S18, the controller 125 changes the photographing setting in accordance with the setting decided by the user U. Here, the controller 125 notifies the controller 114 of the lens-type imaging device 11 of the change in the photographing setting in accordance with need.

In step S19, the controller 125 determines whether or not the photographing operation has been performed by the user U. The photographing operation includes, for example, a pressing operation of a button for a predetermined photographing operation or a photographing operation by a touch panel provided on the portable information terminal 12. In step S19, in the case where the photographing operation is determined as not being performed, the processing returns to step S4. In step S19, in the case where the photographing operation is determined as being performed, the processing moves on to step S20.

In step S20, the controller 125 performs the photographing operation. Therefore, the controller 125 instructs the controller 114 of the lens-type imaging device 11 to start the photographing operation. Having received this instruction, the controller 114 performs imaging by the imaging unit 111 in accordance with the predetermined exposure parameter. The controller 114 transmits the image data obtained by the imaging performed by the imaging unit 111 to the portable information terminal 12 using the communication unit 113a or the communication unit 113b. The communication of this image data is basically performed by using the communication unit 113a. In the case where it is difficult to perform communication by the communication unit 113a, the communication unit 113b is used. When the image data is received, the controller 125 stores the received image data in the memory.

Figure 4F:
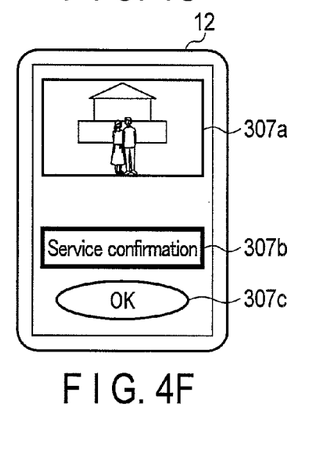

In step S21, the controller 125 performs a recording view display which displays on the display unit 121 an image based on the image data obtained by photographing. FIG. 4F shows a display example of when the recording view display is performed. In the present embodiment, when recording view display is performed, a service confirmation button 307b and an OK button 307c are also displayed with a recording view image 307a.

In step S22, the controller 125 determines whether or not the user U has selected the OK button 307c by the operation of the operation unit 123. In the case where the OK button 307c is determined as not being selected in step S22, the processing moves onto step S23. In step S23, in the case where the OK button 307c is determined as being selected, the processing moves on to step S30.

In step S23, the controller 125 determines whether or not to perform service confirmation in the same manner as in step S10. In step S23, in the case where it is determined to perform the service confirmation, the processing moves on to step S24. In step S23, in the case where it is determined to not perform the service confirmation, the processing returns to step S22.

In step S24, the controller 125 displays on the display unit 121 a list of names of services which may be performed utilizing the image data. The display here is the same as the display of step S11.

In step S25, the controller 125 determines whether or not the user U has selected a name of one service from the names of services displayed on the list by operating the operation unit 123. In step S25, in the case where a name of a service is determined as being selected, the processing moves onto step S26. In step S25, in the case where a name of a service is determined as not being selected, the processing returns to step S23.

In step S26, the controller 125 performs a display corresponding to the selected service. This display is a processing that displays a recording view image indicating the state of the image data when a corresponding service is assumed to have been performed. Basically, the display is performed in the same manner as in step S13.

In step S27, in the same manner as in step S16, the controller 125 determines whether or not the service should be revised. In step S27, in the case where it is determined that the service will not be revised, the processing moves onto step S28. In step S27, in the case where it is determined that the service will be revised, the processing moves on to step S29.

In step S28, the controller 125 determines whether or not the user U has selected the return button by operating the operation unit 123. In step S28, in the case where it is determined that the return button has not been selected, the processing returns to step S27. In step S28, in the case where it is determined that the return button has been selected, the processing returns to step S23.

In step S29, the controller 125 performs the processing of receiving the revise operation from the user U in the same manner as in step S16. After the revision processing, the processing returns to step S27.

Figure 5:
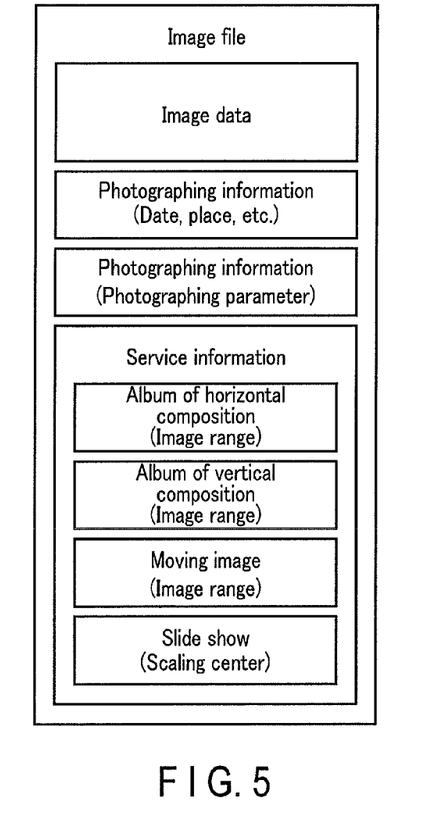
FIG. 5 shows an example of a structure of an image file including image data and service information.

In step S30, the controller 125 records the image data and the service information in the recording unit 122. FIG. 5 shows an example of a structure of an image file including the image data and the service information. The image file of the example shown in FIG. 5 includes, for example, image data, meta information indicating photographing information such as a photographing date and a photographing location, meta information indicating other photographing parameters, and meta information indicating service information such as information presenting a service name and a brief summary thereof. If the image data is a still image, it is recorded in a state compressed by a predetermined compressed format such as a JPEG system, or is recorded in a non-compressed state such as a RAW system. Each of the meta information is recorded, for example, in an Exif tag. The file structure in FIG. 5 is an example. Depending on the content of the service, information on an important position (a position where comments and image processing should not be applied) or an unimportant position (a position where comments and an image processing may be applied) in the image data may be included as the service information. Furthermore, image processing performed in a service or an image specifying method, and various constraint information may be included. For example, in a service of an image sharing site which is exposed to the general public, there are a number of services that take the issue of copyrights and portrait rights into consideration. In the case where there is an image difficult to be played back after photographing, such effect may be recorded accordingly. Furthermore, by recording information on which portion of the image data is used for playback for each situation the image data such as the content of service is used, not only would all of the recorded image data be played back, but, an optimal playback mode may be provided in accordance with various usages.

In step S31, the controller 125 determines whether or not to end the camera mode. For example, in the case where an operation to end the camera application is performed by a user operation unit 123, the camera mode is determined as to end. In step S31, in the case where it is determined to not end the camera mode, the processing returns to step S4. In step S31, in the case where it is determined to end the camera mode, the processing returns to step S1.

As explained above, in the present embodiment, the service information is recorded in association with the image file. In this manner, services performed on the image data in the future will result in the services desired by the user. The service information in the present embodiment includes information regarding a plurality of services which may be performed in the future by utilizing the image data. Therefore, it is possible to have a user's intention reflected even on a service that is not required by the user at the time of generating an image file.

In the present embodiment, a confirmation display indicating a state of the image data when a service is assumed to have been performed is displayed. In this manner, it is possible for the user to confirm the content of the service which may be performed utilizing the image data in advance. The user is also capable of revising the content of the service in accordance with need.

Hereinafter, a modified example of the present embodiment will be explained.

MODIFIED EXAMPLE 1

Figure 6A:
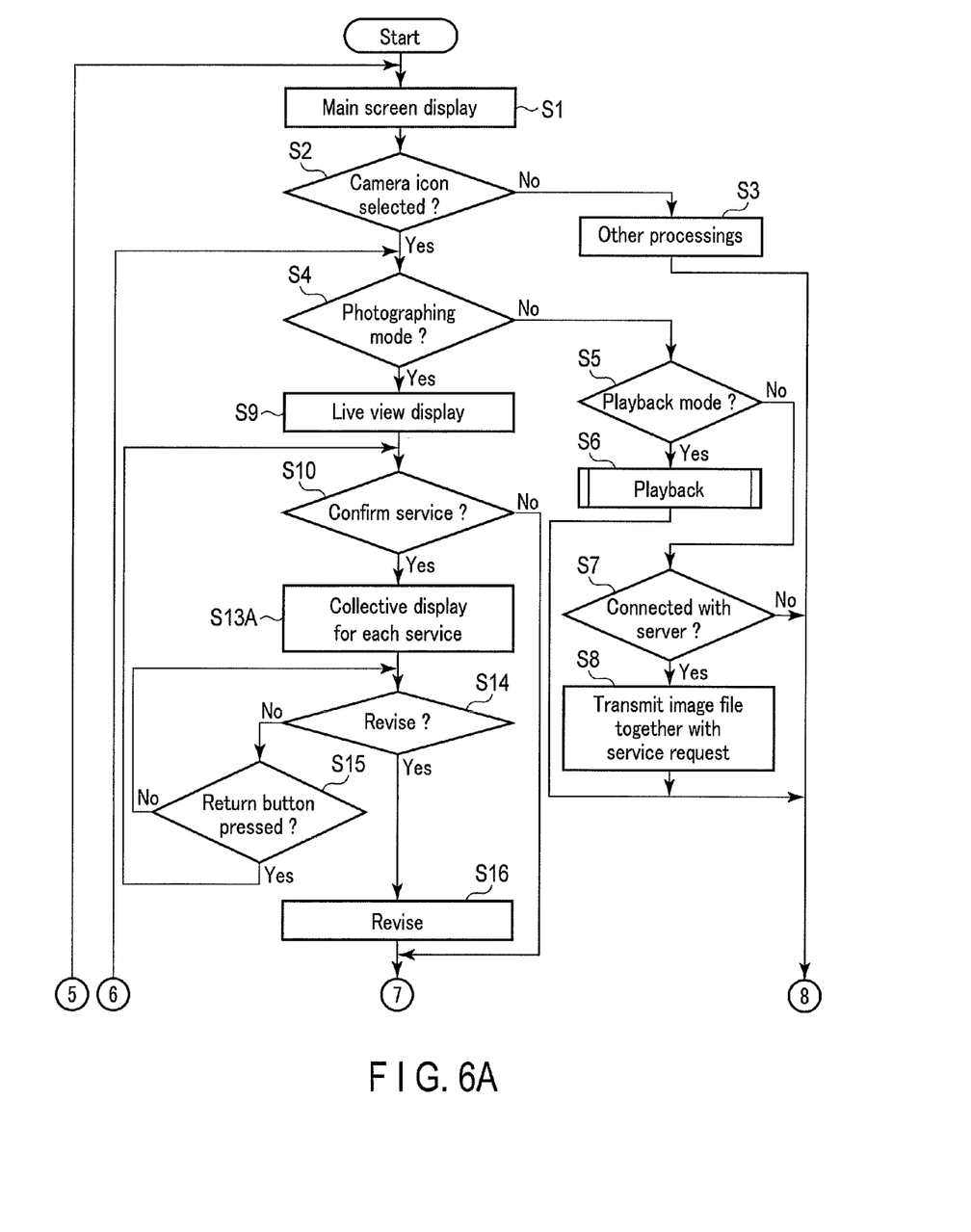
FIG. 6A is a first view of a flowchart showing an operation of an information recording device of a modified example 1.
Figure 6B:
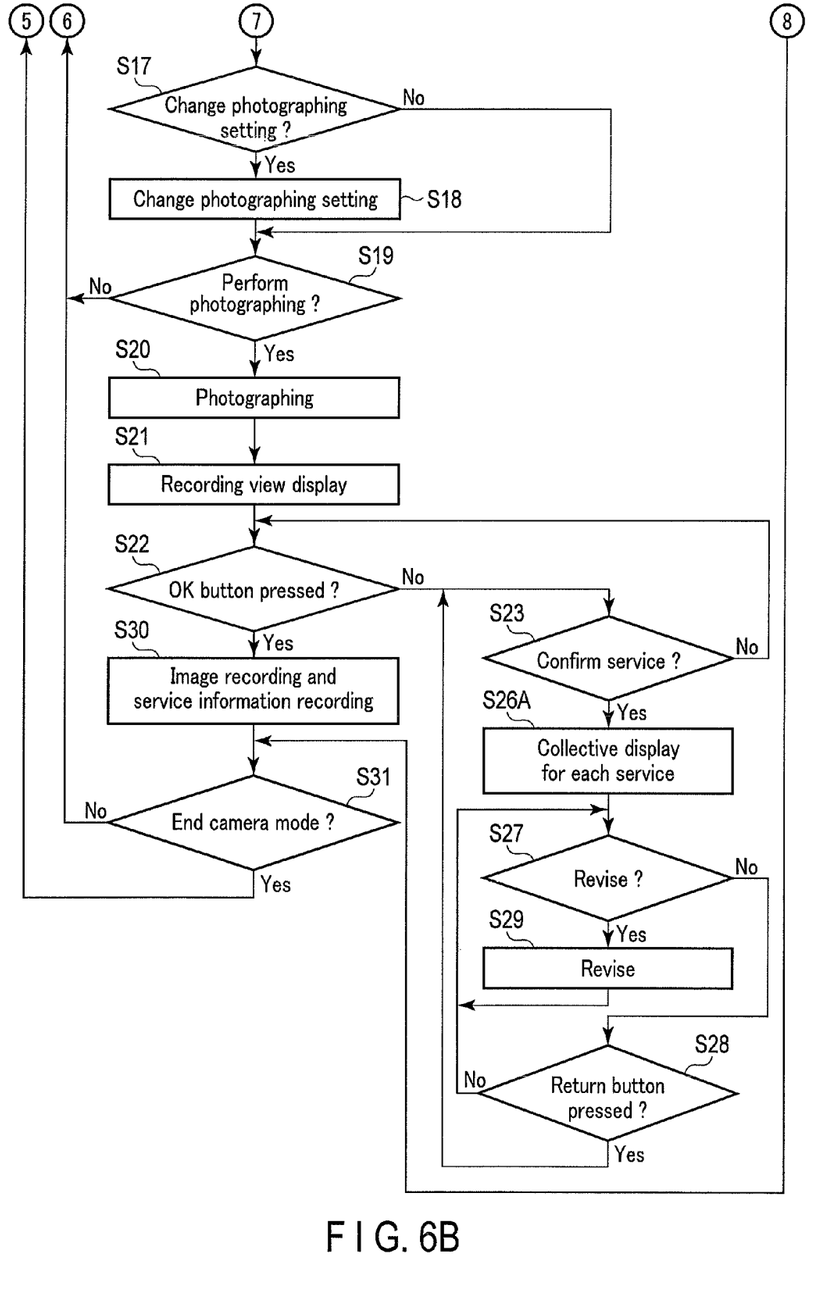
FIG. 6B is a second view of the flowchart showing the operation of the information recording device of the modified example 1.

FIG. 6A and FIG. 6B are flowcharts showing an operation of an information recording device 1 in modified example 1. As for the configuration of the information recording device 1, for example, configuration shown in FIG. 1 may be applied. Therefore, here, the explanation on the configuration will be omitted. In FIG. 6A and FIG. 6B, for the steps identical to those in FIG. 3A and FIG. 3B, the same step numbers as those in FIG. 3A and FIG. 3B will be applied, and the explanations thereof will be omitted. In FIG. 6A and FIG. 6B, step S11 to step S13 are replaced by step S13A, and step S24 to step S26 are replaced by step S26A. Step S13A and step S26A are essentially the same processing.

In FIG. 6A and FIG. 6B, in the case where the service confirmation button 303b is determined as being selected in step S10, the processing moves on to step S13A. In step S13A, the controller 125 collectively displays the live view images corresponding to each of the services that may be performed by utilizing the image data. In step S26A, the controller 125 collectively displays the recording view images corresponding to each of the services that may be performed by utilizing the image data.

Figure 7A:
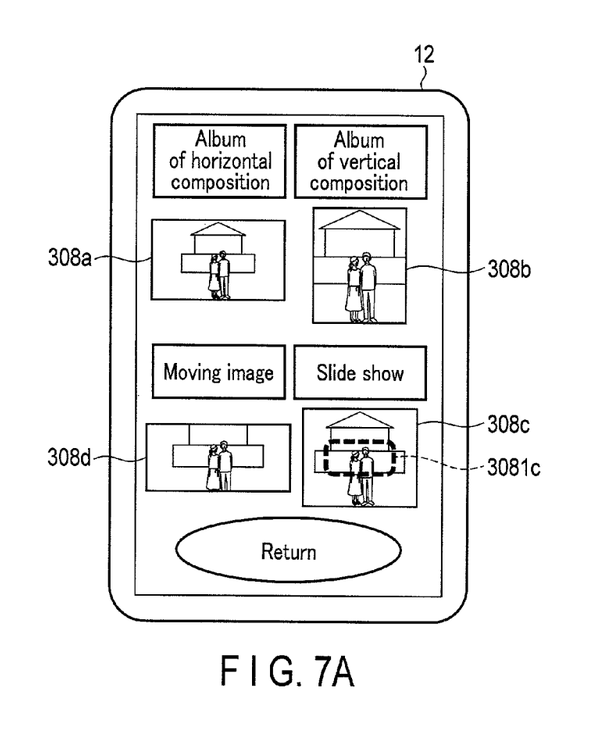
FIGS. 7A and 7B show display examples on a display unit of a portable information terminal of the modified example 1.

FIG. 7A is a first example of a collective display. In this example, a live view image 308a showing a photograph of when assuming that a photograph for an album of a horizontal composition has been created for the album creation service, a live view image 308b showing a photograph of when assuming that a photograph for an album of a vertical composition has been created by the album creation service, a live view image 308c showing a slide show of when assuming that a slide show has been created by the slide show creation service, and a live view image 308d showing a moving image of when assuming that a moving image has been created by the moving image creation service are collectively displayed. Also, on the live view image 308c showing a slide show, a frame 3081c indicating a scaling center of the slide show is displayed. By such display, the user is capable of collectively confirming the contents of the services which may be performed utilizing the image data in advance.

Figure 7B:
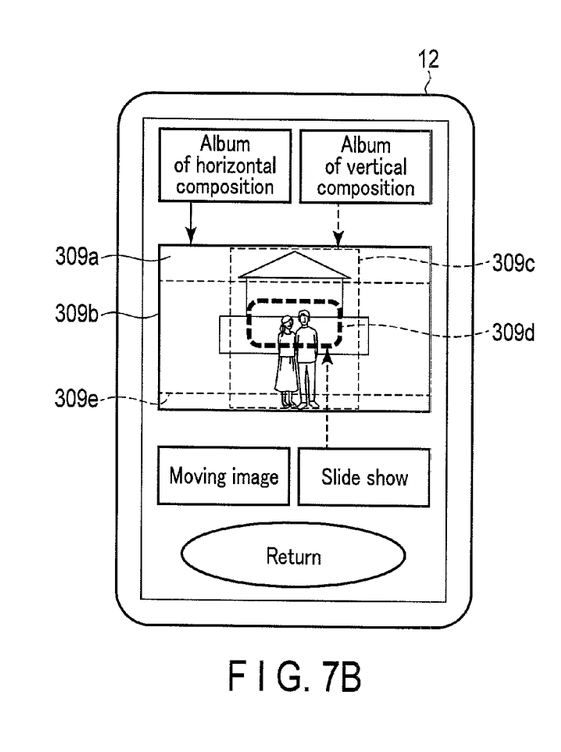

FIG. 7B is a second example of a collective display. In this example, a live view image 309a is displayed as it is, on which a frame 309b indicating an image range of the photograph in a horizontal composition created by the album creation service, a frame 309c indicating an image range of the photograph in a vertical composition created by the album creation service, a frame 309d indicating the scaling center of a slide show created by the slide show creation service, and a frame 309e indicating an image range of the photograph created by the moving image creation service are collectively displayed. Such display also allows the user to collectively confirm in advance the content of the services which may be performed utilizing the image data.

MODIFIED EXAMPLE 2

In the embodiment mentioned above, the confirmation display of the service content and the revision of the service content are performed when performing the live view display and the recording view display. In contrast, the confirmation display of the service content and the revision of the service content may be performed only at a timing of performing one of the live view display and the recording view display, or at timings other than these. For example, the information recording device may be configured in a manner that the confirmation display and the revision of the service content are performed when sending the image file. The information recording device may also be configured in a manner that the confirmation display and the revision of the service content are performed each time a new service is added.

OTHER MODIFIED EXAMPLES

In the embodiment mentioned above, the information recording device 1 comprises the lens-type imaging device 11 and the portable information terminal 12. However, the information recording device 1 may also be configured to function as, for example, both the lens-type imaging device 11 and the portable information terminal 12, such as a smart phone with a function of a digital camera or a camera. Although definitions specifying the services of content creation for viewing, etc. and considering the conformity of aspect ratios, etc. have been extensively carried out, as for images, since there are also images for inspection, documents, and reports other than for viewing, there are different highly specialized services such as an inspection service or an evidence demonstration service for such images. Even in this case, in addition to a simple matter such as aspect ratio, utilization range information within an extensive image is important. Unless the image is utilized by carefully recognizing matters such as where in the photographed image should be inspected, and which portion of the photographed image should be reported, etc., an appropriate service may not be received. Therefore, the service information includes the above effective image range information. Such information is provided by the service server.

In the embodiment mentioned above, the data to be receiving services for has been described as the image data photographed by the information recording device 1. However, the data acquired by the information recording device 1 does not necessarily have to be the image data photographed by the information recording device 1. For example, a service that sends a live view image directly to the service server may also be assumed. In this case, the data to be receiving the service for would be the live view image. In such service, for example, in a system that provides a service which allows a doctor to write remarks into the image data obtained by an endoscopic device, by recording information of an important position in the image data (a position where remarks should not be written) as service information, it is possible to prevent necessary places from being hidden. Here, this may be expressed as effective image range information; however, an expression such as limited image area information may also be possible. The range and limitation do not always have to be based on an aspect ratio-based square. They may be based on a profile of a specific shape, or can also be applied to a method of designating ranges and limitations, such as a specific color, a specific contrast, a specific distance, or a specific size. In this case, this will correspond to information such as effective image condition information. In such application, the image in the various aspects shown in FIG. 2 would be expressed and displayed as an extracted image of a specific shape or a specific color, or as an image refined under a specific condition. Depending on the service, in some cases, image processing would be performed. Therefore, a display showing how this processed image would turn out may also be performed. Such service can also be applied to fields such as a microscope device, or a surveillance device.

In the above manner, if the service information is recorded for the image, the character of the image may be grasped to increase flexibility in image application such as receiving a similar service, or receiving a substitute service. If usage restrictions, etc. based on copyrights and portrait rights in a specific service are reflected by user recognition or operation when photographing, or by automatic reflection (blurring faces, addresses, and numbers, etc.), the image can be diverted and applied directly to other similar services without causing similar problems.

Furthermore, in the embodiment mentioned above, the data to be receiving the service for is considered as the image data. However, the data to be receiving the service for need not necessarily be the image data. For example, in the case of the usage of voice data, only a portion that is necessary in the voice collected by a microphone or a recorder may be recorded. Depending on the service, it is important to acquire different information such as on whether noise reduction should be performed or tamperproofing should be applied on the acquired voice. For example, in a dictation service, etc., by recording information that noise removal would be or has been performed in accordance with the frequency of a human voice, this may be performed on a cloud or restored on a cloud. Alternatively, since information that the recording is a human voice, or the kind of service the information is premised on, etc. may also be added to the file, data would be utilized actively, and the flexibility of information usage uploaded by the user may be increased. In a manner of speaking, the service information can be rephrased as information of a method for utilizing the data expected by the user. Since this would provide a general device capable of receiving various services as appropriate, it is possible to enhance convenience as a device undertaking dual or triple roles with one device. In other words, the technique of the present embodiment may be applied to various types of systems that are assumed as receiving some kind of services for specific data. In cases other than the case of the image data, it is necessary to provide a corresponding data acquisition unit.

Each processing performed by the embodiment mentioned above can also be stored as a program that can be executed by a CPU, etc. as a computer. The processing can also be stored in the storage mediums of external storage devices, such as a memory card, a magnetic disk, an optical disk, or a semiconductor memory, and distributed. The CPU, etc. is capable of executing the processing mentioned above by reading a program stored in the storage medium of this external storage device, and having the operation controlled by this read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording device which communicates with a plurality of service servers each of which perform different services, comprising:
   an imaging device configured to acquire image data;
   a controller comprising a memory configured to:
      record service information including information regarding a demand for a service performed by each of the service servers;
      record a selection of at least one service to be performed;
      generate an image file comprising the image data associated with the selected service information in a single file; and
      control communication of the generated image file to the service servers; and
   a display controller configured to:
      display a service confirmation icon on a screen of a same display as a live view image;
      display a list of services that may be performed by each of the service servers when the service confirmation icon is selected; and
      obtain a preview image assuming that at least one service selected from the list is performed according to the demand by communication with at least one of the service servers that performs the selected service to display on a display the obtained preview image with the live view image.

2. The information recording device according to claim 1, wherein the controller stores the data acquired by the imaging device, the service information, and the generated image file in a memory.

3. The information recording device according to claim 1, wherein the service information is recorded as meta information of the generated image file.

4. The information recording device according to claim 1, wherein the display controller displays collectively on the display a view of the image data assuming that each of a plurality of the selected services is performed.

5. The information recording device according to claim 1, wherein
   the at least one selected service includes an album creation service,
   the service information includes information of an image range of a photograph arranged in an album that is created in the album creation service.

6. The information recording device according to claim 1, wherein
   the at least one selected service includes a slide show creation service, and
   the service information includes information of an area in which scaling processing is performed in an image displayed by a slide show created in the slide show creation service.

7. The information recording device according to claim 1, wherein
   the at least one selected service includes a moving image creation service, and
   the service information includes information of an image range of a moving image created in the moving image creation service.

8. The information recording device according to claim 1, wherein the controller displays the plurality of services which may be selected on a display.

9. The information recording device according to claim 1, wherein the controller displays the plurality of services which may be selected on a touch display; and
   the controller determines the at least one selected service in response to a touch operation on the touch display.

10. An information recording method for communicating with a plurality of service servers each of which perform different services, comprising:
    acquiring image data using an imaging device;
    providing a controller comprising a memory to execute:
       recording service information including information regarding a demand for a service performed by each of the service servers;
       recording a selection of at least on service to be performed;
       generating an image file comprising the image data associated with the selected service information in a single file; and
       controlling communication of the generated image file to the service servers; and
    displaying a service confirmation icon on a screen of a same display as a live view image;
    displaying a list of services that may be performed by each of the service servers when the service confirmation icon is selected; and
    obtaining a preview image assuming that at least one service selected from the list is performed according to the demand by communication with at least one of the service servers that performs the selected service to display on a display the obtained preview image with the live view image.

11. A computer-readable non-transitory storage medium storing an information recording program which causes a computer, having a controller comprising a memory, to communicate with a plurality of service servers each of which perform different services, comprising:
    acquire image data using an imaging device;
    record service information including information regarding a demand for a service performed by each of the service servers;
    recording a selection of at least on service to be performed;
    generate an image file comprising the image data associated with the selected service information in a single file;
    control communication of the generated image file to the service servers; and
    display a service confirmation icon on a screen of a same display as a live view image;

display a list of services that may be performed by each of the service servers when the service confirmation icon is selected; and obtain a preview image assuming that at least one service selected from the list is performed according to the demand by communication with at least one of the service servers that performs the selected service to display on a display the obtained preview image with the live view image.

* * * * *